Dec. 10, 1929.         J. G. HAWLEY              1,739,304
                       SHOCK ABSORBER
                     Filed April 9, 1927

INVENTOR
Jesse G. Hawley
BY
Albert T. St Clair
ATTORNEY

Patented Dec. 10, 1929

1,739,304

UNITED STATES PATENT OFFICE

JESSE G. HAWLEY, OF PAINTED POST, NEW YORK

SHOCK ABSORBER

Application filed April 9, 1927. Serial No. 182,422.

This invention relates to the art of shock absorbers, and more particularly to shock absorbers adapted to check or cushion the body of a vehicle against rebounding shocks.

The shock absorber disclosed herein operates on the toggle joint principle in conjunction with a friction member, the parts being so related that they can only slip, with reference to one another, to restore the shock absorber to normal position, after it has taken up a shock, by overcoming a resistance proportional to the magnitude of the shock.

It is an object of this invention to provide a shock absorber which will be simple in construction and efficient in operation.

It is also an object of this invention to provide a shock absorber which can be readily converted from a right hand to a left hand member, or vice versa.

It is another object to provide a shock absorber which is self compensating for wear, and which will therefore have increased life.

It is a further object to provide a shock absorber which will not require any attention or adjustment after installation, and which can therefore be sealed at the factory, thus making it fool-proof.

It is a still further object to provide a shock absorber which will offer a resistance proportional to the amount of the shock and which will only yield, after taking up a shock, at a uniform rate, regardless of the magnitude of the shock.

Figure 1:
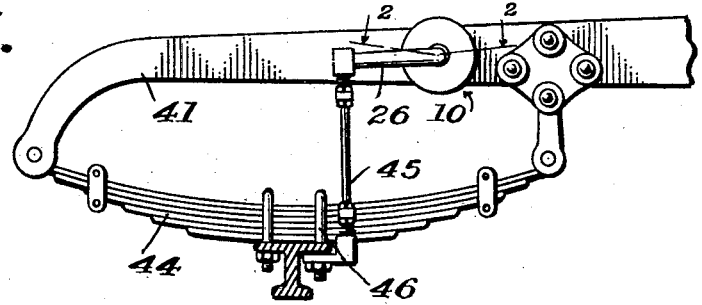
Figure 2:
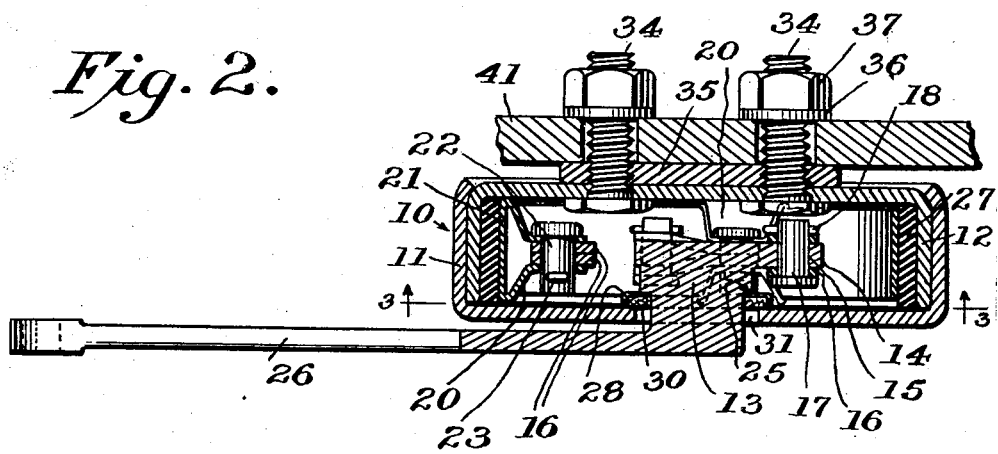
Figure 3:
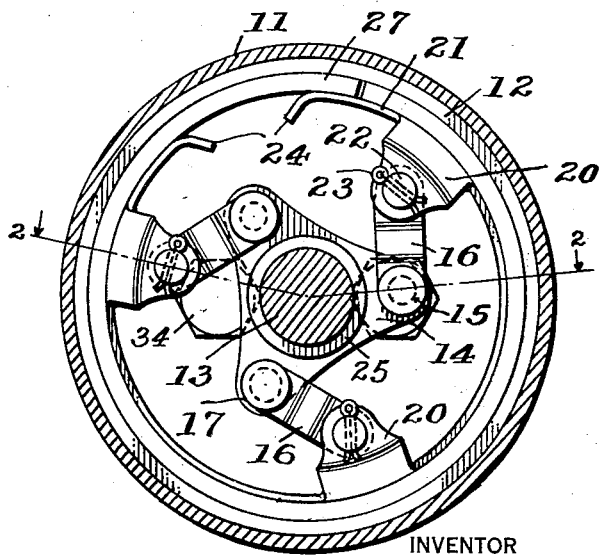

With the above and other objects in view, which will be apparent as the description proceeds, I have disclosed my invention in the following specification taken in connection with the accompanying drawings, in which:

Fig. 1 is a side elevation showing a portion of the front end of a vehicle and the manner in which my shock absorber is attached thereto;

Fig. 2 is a central longitudinal section through my shock absorber on the line 2—2 of Figs. 1 and 3; and Fig. 3 is a longitudinal section through my shock absorber on the line 3—3 of Fig. 2, but with certain parts omitted.

The shock absorber disclosed herein consists essentially of a housing 10, composed of substantially similar and snugly-fitting cup-shaped casings 11 and 12 preferably adapted to form a fool-proof and non-separable enclosure, and the operating parts described hereinafter.

These operating parts include a hub member 13, provided with a series of lugs 14 integral therewith. In the embodiment of my invention disclosed herein I have illustrated three of such lugs, but a larger number could be used if desired. Each of these lugs 14 is perforated at 15, and is adapted to be received between a pair of co-acting toggle link members 16 which are pivotally secured thereto by studs 17 and cotter pins 18. The opposite ends of these co-acting links 16 are attached to lugs 20 which are formed integrally with a resilient band member 21 and extend inwardly therefrom, the links being pivotally secured to the lugs by studs 22 and cotter pins 23.

As shown herein, the resilient member 21 extends nearly but not completely around the inner periphery of the casing 12, and is provided with inturned ends 24 that are spaced apart to permit of appreciable contraction of the resilient member when desired.

At one end the hub member 13 is provided with a shoulder 25, for a purpose to be described later, and also with an operating lever 26, which is preferably integral with the hub member.

The friction producing member 27 in my improved shock absorber is preferably a section of asbestos brake band lining, or similar material, which is interposed between my resilient member 21 and the inner periphery of the cup-shaped member 12. As shown in Fig. 3, this is preferably of a length substantially equal to that of the inner periphery of the member 12 and, as shown in Fig. 2, it is preferably of a width about equal to the width of the flanges on the member 12.

When it is desired to assemble my shock absorber, the resilient member 21 is connected to the lugs 14 on the hub member 13 by the links 16, and a metal retaining washer 28 and a felt moisture-excluding washer 30 are inserted against the shoulder on the hub member 13 by sliding them over the lever 26, after which the outer end of the latter is inserted through an opening 31, provided in the cup-shaped member 11, and is given a right angle turn to bring the washer 30 parallel with the inner face of the cup-shaped member. As shown in Fig. 2, the felt washer 30 is supported in a recess in the metal retaining washer 28 to prevent undue spreading of the felt washer, but the latter is slightly thicker than the recess in order that it may project outwardly therefrom and exert a slight cushioning action between the washer 28 and the body of the cup-shaped member 11.

The friction member 27 is arranged in the cup-shaped member 12 in contact with the inner periphery thereof, and the latter assembly is inserted into the cup-shaped member 11 around the resilient member 21. As shown in Fig. 2, when the shock absorber is assembled there is preferably a space between the outside of member 11 and the adjacent side of lever 26. This space not only prevents binding between these parts when the shock absorber is operating, but facilitates the assembling of the two cup-shaped members. When the member 12 is to be inserted into the member 11, the latter, with the hub and toggle assembly mounted in it, is placed on any suitable flat surface, thus causing the lever 26 to contact with the outside of the member 11 and the edge of the resilient member 21 to be substantially flush with or project slightly above the flanged portion of the member 11. The resilient member is then contracted slightly, as by pulling its free ends 24 together, or by slightly moving the lever 26 in the direction which will contract these ends. It is then an easy matter to insert the member 12, provided with the friction lining 27, between the flanged portion of the member 11 and the resilient member 21. The members 11 and 12 are then pressed tightly together, forcing the washer 30 into contact with the inside of the body portion of member 11 and spacing the lever 26 from the outside of said body member.

With the parts thus assembled the free edges of the cup-shaped member 11 are pressed inwardly around the back of the cup-shaped member 12, thus permanently securing these parts together and preventing their disengagement without breaking the shock absorber.

To facilitate the attachment of my shock absorber to the vehicle on which it is to be used, casing 12 is provided with a pair of studs 34 which pass through the body portion thereof and also through a spacer plate 35, which is thereby secured to the outside of the casing 12. Each of these studs is provided with a washer 36 and a nut 37.

My shock absorber may be mounted on the vehicle in various ways, but in Figs. 1 and 2 it is shown as being attached to the front end of the frame 41 of the vehicle by drilling two holes in the frame, removing the nuts 37 and washers 36, passing the studs 34 through the frame (see Fig. 2), and retaining the shock absorber in the desired position by reapplying the washers and nuts 36 and 37, respectively. Relative movement between the car springs 44 and the frame 41 is transmitted to the shock absorber by any suitable coupling having flexible connections, such as the link 45 (Fig. 1), whose upper end is attached to the lever 26 that extends from housing 10, and whose lower end is attached to a spring clip 46. The subject matter of the link 45 is not claimed herein since this is disclosed and claimed in my copending application Serial No. 33,688, filed May 29, 1925.

The brake lining 27 is not secured to either the resilient member 21 or the cup-shaped member 12, but slips or creeps in the space between these members during the locking actions of my shock absorber. This causes the locking actions to take place between different surfaces at different times and distributes the wear over the entire section of brake lining, thus doing away with the unequal wear on different portions of the brake lining which would result were the latter secured to the resilient member. This also prevents any excessive heating of the shock absorber in consequence of the locking actions. The construction just described, in conjunction with the toggle links 16, applies an even pressure on all portions of the brake lining, and will take up any variation in thickness of the brake lining, thus making my shock absorber self compensating for wear.

When thus assembled, no further attention will be required and it will not even require adjustment to secure a greater or lesser resistance to relative movements of the spring and frame of the vehicle. In fact my shock absorber is so constructed that the resistance which it offers to the return movement of the spring or the frame, with respect to the other of these members, is wholly dependent upon the amount of the separating movement therebetween. In other words, the greater the shock the greater will be the amount the car springs 44 will be flexed, and consequently the greater will be the angular movement of the lever 26. This will require a greater amount of return movement for the lever to reach its normal position and, owing to the resiliency of the car springs 44, the latter will exert a correspondingly greater pressure on the toggle links 16, with a consequently greater lateral expansive pressure on the resilient member 21, the brake lining 27 and the casing 12, and therefore the exertion of a greater resistance or cushioning movement to the return of the car springs and frame to their normal positions. This increased resistance or cushioning movement is directly proportional to the amount the car springs are flexed, and therefore prevents the spring and frame from returning to their normal positions at a faster rate after a severe shock than after a small shock. This provision for insuring a uniform rate of yielding, regardless of the magnitude of the shock, assures the same soft cushioning action for all classes of shocks.

It will be obvious that my shock absorber will only exert a resistance to relative movements of the spring 44 and frame 41 in a given direction, namely the separating movement therebetween, as the compressive movement will merely cause the hub member 13 to rotate in a clockwise direction, as viewed in Fig. 3, with the consequent contraction of the resilient member 21. This contraction is positive, owing to the definite connection between the resilient member, toggles and hub, eliminating all the disadvantages which would be present in a floating member, and producing a construction which pulls the ends 24 of the resilient member 21 inwardly to give an immediate release, or simultaneously, and with a uniform pressure, pushes the entire member 21 into contact with the brake lining 27 to give an immediate shock absorbing action the instant the separating movement commences.

A single form of my shock absorber may be used for both right and left hand units and the hub member, toggle links and spring member may be converted from a right hand mechanism to a left hand mechanism, or vice versa, by merely swinging the links to one side or the other of their pivotal connection with the hub member, by a single movement of the lever 26, prior to their insertion in the housing.

While my shock absorber may be made of various materials, I prefer to make it of such materials, and in such a manner, that no machined parts, except stock parts, such as the studs 17 and 22, will be necessary. All of the remaining metal parts may be made by forging, stamping, or pressing operations. I prefer to make the hub 13 and lever 26 out of a single steel forging, although if desired these may be made in separate parts and united in any well known manner, as by bolting them together. The cup-shaped casings 11 and 12, which together form the housing 10, are preferably made of pressed steel, and the resilient ring 21 and the links 16 are preferably steel stampings. The studs are preferably of hardened machine steel, and the metal retaining washer 28 is preferably a thin steel stamping.

It will therefore be apparent that my shock absorber is made of relatively few and simple parts which can be manufactured easily and cheaply and assembled by unskilled labor, thus resulting in the production of a highly efficient shock absorber which can be manufactured at a low cost and will not require any adjustment after assembly, and therefore permitting it to be sealed at the factory.

My shock absorber will require no lubrication, and there are no parts which will show any appreciable wear even after long-continued use. In fact actual tests have demonstrated that even the brake lining shows practically no wear, but only a compression, after over 25,000 miles of service, and this compression is compensated for by the toggle links.

It will be obvious that the details of my shock absorber may be varied in numerous ways, within the scope of the following claims, without departing from the spirit of my invention.

I claim:

1. In a shock absorber, the combination of a full floating friction member, means for expanding it into braking position, and means for positively withdrawing said last-mentioned means.

2. In a shock absorber, the combination of a housing, a resilient member, a brake band, and means for expanding said resilient member against said brake band and for positively withdrawing it therefrom.

3. In a shock absorber, the combination of a housing, a full floating brake band, a single resilient circular ring for cooperation therewith, and a toggle member for expanding said ring against said brake band.

4. In a shock absorber, the combination of a brake band, a resilient ring for cooperation therewith, and a toggle pivoted to the ring for expanding said ring against said brake band.

5. In a shock absorber, the combination of a brake band, a resilient ring for cooperation therewith, and a plurality of toggles pivoted to the ring for expanding said ring against said brake band.

6. In a shock absorber, the combination of a housing, a friction member, and means for expanding the friction member against the housing, said last mentioned means comprising a hub member, a resilient band for cooperation with the friction member and a series of toggle links pivoted to both the hub member and the resilient band.

7. In a shock absorber, the combination of a housing, a brake band, and means for expanding the brake band against the housing, said last mentioned means comprising a hub member, a circular member for cooperation with the brake band and a series of toggle links pivoted to both the hub member and the circular member.

8. In a shock absorber, the combination of a housing, a brake band, a resilient member for expanding said brake band against the housing member, a hub member for receiving the movements which actuate the shock absorber, and a pivoted toggle link for transmitting said actuating movements from the hub member to the resilient member.

9. A pressure exerting member for a shock absorber comprising a hub member, a resilient circular member, and a series of toggle links pivoted to both of these members.

10. A pressure exerting member for a shock absorber comprising a hub member, a resilient circular member, and a series of toggle links, one end of each toggle link being pivoted to one of said members and the other end of each toggle link being pivoted to the other of said members.

11. In a shock absorber, the combination of a housing, a full floating brake band, a single resilient circular ring for cooperation therewith, and toggle means for expanding said ring against said brake band with a uniform pressure at all points.

12. In a shock absorber, the combination of a housing, a brake shoe for cooperation therewith, and means for compensating for wear on the latter, said last-mentioned means including an open-ended continuous pressure-applying member unconnected with the brake shoe and a series of toggles for cooperation with the pressure member.

JESSE G. HAWLEY.